(12) United States Patent
Yang et al.

(10) Patent No.: US 8,286,422 B2
(45) Date of Patent: Oct. 16, 2012

(54) APPARATUS FOR COOLING OVERHEATED GAS IN ENGINE ROOM

(75) Inventors: Hak Yong Yang, Gyeongsangnam-do (KR); Syeong Ho Choi, Gyeongsangnam-do (KR); Su Jin Choi, Gyeongsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 306 days.

(21) Appl. No.: 12/693,070

(22) Filed: Jan. 25, 2010

(65) Prior Publication Data

US 2010/0186395 A1    Jul. 29, 2010

(30) Foreign Application Priority Data

Jan. 23, 2009   (KR) .................. 10-2009-0005762

(51) Int. Cl.
*F01N 3/00* (2006.01)
(52) U.S. Cl. ................. 60/317; 60/298; 60/320
(58) Field of Classification Search ............. 60/298, 60/316, 317, 320
See application file for complete search history.

(56) References Cited

U.S. PATENT DOCUMENTS

| | | | | |
|---|---|---|---|---|
| 4,060,985 A * | 12/1977 | Fukushima | ..................... | 60/319 |
| 5,170,020 A * | 12/1992 | Kruger et al. | ................. | 181/211 |
| 6,832,872 B2 * | 12/2004 | Koelm et al. | ................. | 404/108 |
| 7,193,333 B1 * | 3/2007 | Kitch | ............................ | 290/1 A |
| 7,207,172 B2 * | 4/2007 | Willix et al. | .................... | 60/317 |
| 7,491,012 B2 * | 2/2009 | Weiser | .......................... | 404/108 |
| 2006/0179815 A1 * | 8/2006 | Means | .......................... | 60/39.5 |
| 2007/0245725 A1 * | 10/2007 | Brown et al. | ................... | 60/317 |
| 2008/0092533 A1 * | 4/2008 | Tennison | ........................ | 60/317 |
| 2009/0120066 A1 * | 5/2009 | VanderGriend et al. | ........ | 60/285 |
| 2010/0242462 A1 * | 9/2010 | Smith | ............................. | 60/324 |
| 2011/0283687 A1 * | 11/2011 | Dobler et al. | .................. | 60/299 |

* cited by examiner

*Primary Examiner* — Thomas Denion
*Assistant Examiner* — Patrick Maines
(74) *Attorney, Agent, or Firm* — Ladas & Parry LLP

(57) ABSTRACT

An apparatus for cooling overheated gas generated from a diesel particulate filter which is connected between a diesel engine and an exhaust pipe of the diesel engine is disclosed. The apparatus includes a tail pipe for discharging outwardly the overheated gas discharged from the diesel particulate filter, a cooling fan, provided at one side of an engine room, for generating an air stream by sucking ambient air, and a diffuser enclosing an outer circumference of the tail pipe in such a way a space is formed between the diffuser and the tail pipe to prevent the diffuser from directly contacting the tail pipe. The engine room is provided with a through-hole penetrating one side of the engine room, and the tail pipe has one end connected to the diesel particulate filter, and the other end extended outwardly from the engine room through the through-hole.

11 Claims, 3 Drawing Sheets

APPARATUS FOR COOLING OVERHEATED GAS IN ENGINE ROOM

CROSS-REFERENCE TO RELATED APPLICATIONS

This application is based on and claims priority from Korean Patent Application No. 10-2009-5762, filed on Jan. 23, 2009, in the Korean Intellectual Property Office, the disclosure of which is incorporated herein in its entirety by reference.

FIELD OF THE DISCLOSURE

The present disclosure relates to an apparatus for cooling overheated gas in an engine room, and more specifically, to an apparatus for lowering a temperature of overheated gas, which is generated in a combustion process of an electric heater or burner so as to eliminate particulate matter accumulated on a diesel particulate filter of a diesel engine, by using a diffuser.

BACKGROUND OF THE DISCLOSURE

A diesel engine is generally used in trains, vessels, construction equipment or the like, and the use of such a diesel engine is becoming increasingly common due to serious introduction of diesel sedans.

The increased use of the diesel engine causes the emission of particulate matter (PM) contained in exhaust gas discharged from the diesel engine to increase. The particulate matter is a primary cause of environmental pollution, in particular, air pollution, and if it is sucked in lungs or respiratory organ of a human body, it causes fatal damage to the human body. Therefore, it tightens regulations on the emission of the particulate matter all over the world.

In order to address the above problem such as environmental pollution, a diesel particulate filter (DPF) for collecting and processing the particulate matter to prevent discharge of the particulate matter from the diesel engine to the atmosphere has been developed. With the diesel particulate filter for the diesel engine, if it reaches a predetermined time after the particulate matter is collected by the filter, the filter is regenerated by repeating a process of combusting the filtered exhaust gas or getting the particulate matter off the filter. In case of the latter, if the particulate matter is deposited onto an interior wall of the filter, the particulate matter is likely to be hardened, and thus the particulate matter is not easily got off the filter. In addition, the performance of the filter is deteriorated by the particulate matter remaining on the filter. For this reason, as the former, most of the diesel particulate filters collect the particulate matter and forcibly burn it by using an electric heater or burner.

FIG. 1 is a cross-sectional view of an engine room 7 equipped with a diesel particulate filter 6 of a related art. Referring to FIG. 1, the exhaust gas emitted from the diesel engine 5 passes through a diesel particulate filter 6, and is then discharged to a tail pipe 1.

However, since the diesel particulate filter 6 forcibly burns the particulate matter by using the electric heater or burner at the time of regenerating the filter, gas of very high temperature, for example, the highest 1000° C., is discharged through the tail pipe 1. Injury of a human body of fire may be caused by the overheated gas.

In addition, since the tail pipe 1 is heated by the overheated gas, the person may suffer burn even by contacting the tail pipe 1, even though directly coming in contact with the overheated gas.

Moreover, if the overheated gas discharged through the tail pipe 1 flows backward into the engine room 7, the durability of various components and electric wiring in the engine room is deteriorated.

SUMMARY OF THE DISCLOSURE

Accordingly, the present disclosure is intended to solve the above-mentioned problems occurring in the prior art while advantages achieved by the prior art are maintained intact.

One object of the present disclosure is to provide an apparatus for cooling overheated gas generated at the time of regenerating a filter of a diesel particulate filter in an engine room which can lower a temperature of the overheated gas by mixing the overheated gas with air stream generated from a cooling fan by a diffuser.

In order to accomplish these objects, there is provided an apparatus for cooling overheated gas generated from a diesel particulate filter which is connected between a diesel engine and an exhaust pipe of the diesel engine, the apparatus including a tail pipe for discharging outwardly the overheated gas discharged from the diesel particulate filter; a cooling fan, provided at one side of an engine room, for generating an air stream by sucking ambient air; and a diffuser enclosing an outer circumference of the tail pipe in such a way a space is formed between the diffuser and the tail pipe to prevent the diffuser from directly contacting the tail pipe, wherein the engine room is provided with a through-hole penetrating one side of the engine room, and the tail pipe has one end connected to the diesel particulate filter, and the other end extended outwardly from the engine room through the through-hole.

Preferably, the tail pipe is provided with a plurality of guides inwardly embossed on the outer circumference of the tail pipe to prevent the overheated gas from flowing back in the engine room and smoothly guide the air stream into the tail pipe.

Preferably, the diffuser is adapted to lower a temperature of the overheated gas by mixing the air stream with the overheated gas discharged from the tail pipe or guiding the air stream into the tail pipe.

Preferably, the diffuser includes a sealing portion at a position in which the diffuser is engaged to the through-hole to completely seal a gap between the diffuser and the through-hole.

With the configuration, the apparatus for cooling the overheated gas of the engine room according to the present disclosure lowers the temperature of the overheated gas discharged from the tail pipe by mixing the air stream generated from the cooling fan with the overheated gas by the diffuser, thereby decreasing the possibility of injury of a human body, such as burn, or fire.

Further, since the tail pipe is enclosed by the diffuser, it can prevent the human from directly contacting the tail pipe heated by the overheated gas to decrease the possibility of the burn.

In addition, it is possible to prevent the overheated gas from flowing back in the engine room by using the guides formed on the tail pipe, thereby preventing damage of various components and electric wiring in the engine room.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, exemplary embodiments of the present disclosure will be described with reference to the accompanying drawings. The matters defined in the description, such as the detailed construction and elements, are nothing but specific details provided to assist those of ordinary skill in the art in a comprehensive understanding of the present disclosure, and thus the present disclosure is not limited thereto.

Figure 1:
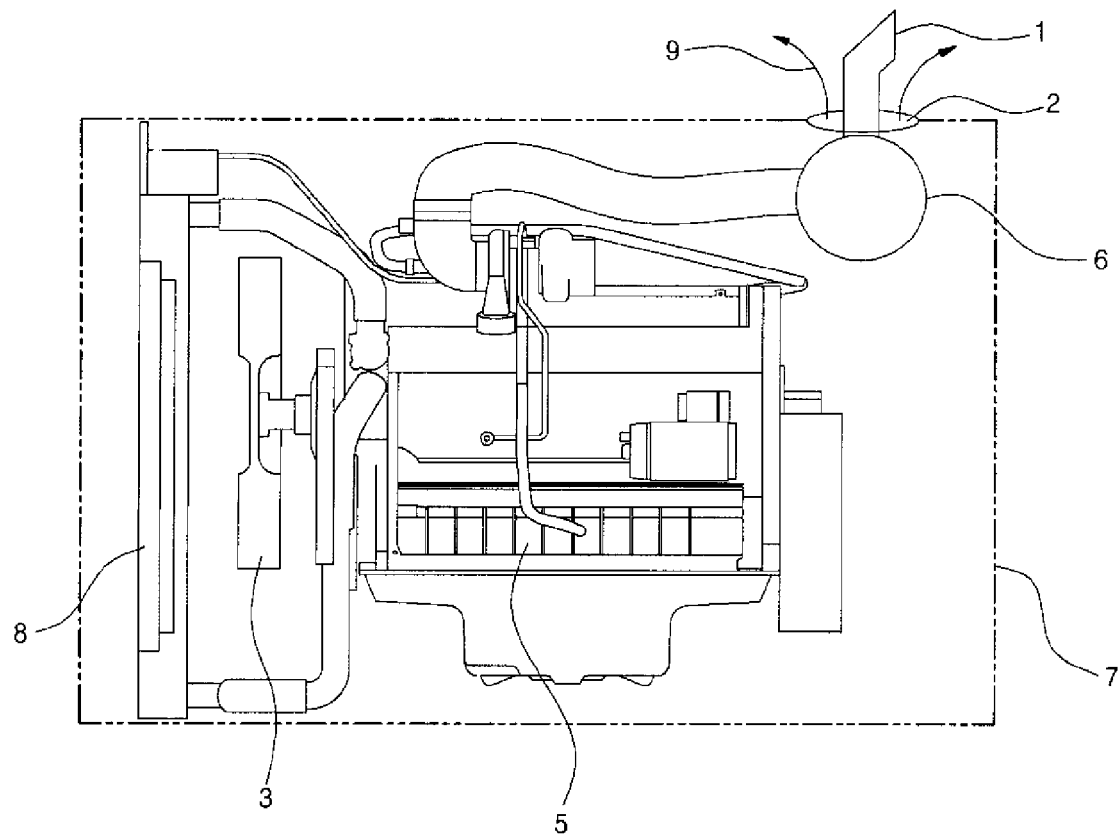
FIG. 1 is a cross-sectional view illustrating an engine room equipped with a diesel particulate filter of a related art.
Figure 2:
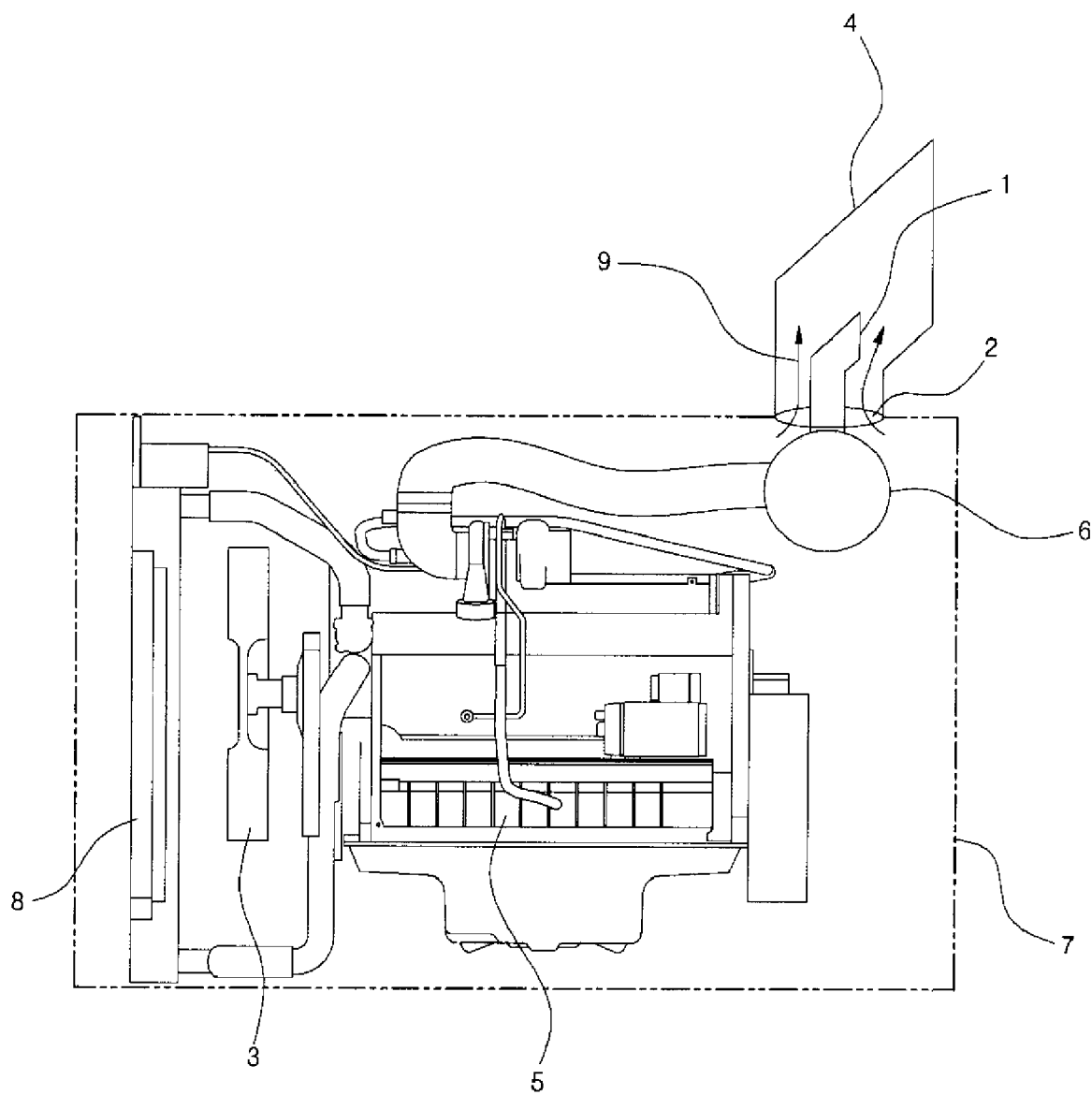
FIG. 2 is a cross-sectional view illustrating a diesel particulate filter of an engine room according to an embodiment of the present disclosure.

FIG. 2 is a cross-sectional view illustrating a diesel particulate filter of an engine room according to an embodiment of the present disclosure.

Referring to FIG. 2, an apparatus for cooling overheated gas generated at the time of regenerating a diesel particulate filter provided in an engine room of a diesel engine according to an embodiment of the present disclosure is characterized by including a tail pipe 1 for discharging the overheated gas outwardly, a cooling fan 3 for generating an air stream 9, and a diffuser 4 for mixing the overheated gas with the air stream 9, in which one side of the engine room 7 is provided with a through-hole 2.

The diesel engine 5 is commonly used in trains, vessels, construction equipment or the like, and discharges particulate matter which causes environmental pollution. The diesel particulate filter 6 is a device, connected to an exhaust pipe of the diesel engine 5, for collecting and treating the particulate matter, and burns the particulate matter accumulated on a filter to regenerate the filter. In this instance, the overheated gas is discharged from the tail pipe 1 of the diesel particulate filter.

The engine room 7 is a space provided in the diesel engine 5 and the diesel particulate filter 6.

Further, the tail pipe 1 has one end connected to the diesel particulate filter 6, and the other end extended outwardly from the engine room 7 through the through-hole 2 to discharge exhaust gas processed by the diesel particulate filter and also discharge the overheated gas generated in a combustion process outwardly from the engine room 7 in the case in which the diesel particulate filter 6 regenerates the filter. Preferably, the tail pipe 1 is made of a material having heat resistance and heat isolation to prevent it from being deformed and ruptured when the overheated gas is discharged. Further, the tail pipe 1 can withstand high pressure.

Figure 3:
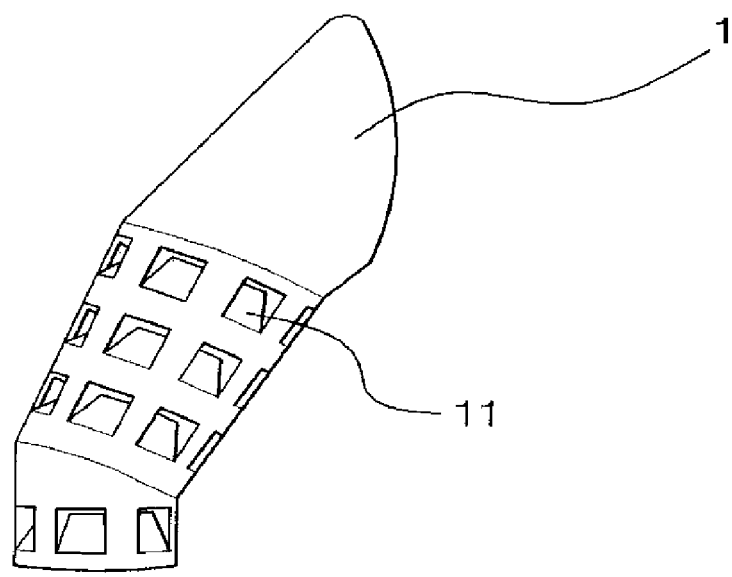
FIG. 3 is a perspective view illustrating a tail pipe provided in the diesel particulate filter of the engine room shown in FIG. 2.

FIG. 3 is a perspective view illustrating the tail pipe 1 provided in the diesel particulate filter of the engine room shown in FIG. 2.

Referring to FIG. 3 the tail pipe 1 includes a plurality of guides 1 formed on a circumference of the tail pipe 1, the guides being embossed inwardly from the circumference, so that the overheated gas is guided outwardly from the tail pipe 1 along the guides 11 to prevent backflow of the overheated gas, and the air stream 9 generated by the cooling fan 3 is guided into the tail pipe 1 along the guides to mix with the overheated gas, thereby effectively lowering a temperature of the overheated gas.

Further, the cooling fan 3 is adapted to generate the air stream 9 lowering the temperature of the overheated gas. The cooling fan 3 is positioned at one side of the engine room 7, and sucks external air to generate the air stream 9 which is mixed with the overheated gas to lower the temperature of the overheated gas discharged in the filter regenerating process of the diesel particulate filter 6.

Preferably, the cooling fan 3 is positioned in the rear of a radiator 8 to block an influence of the heat generated at the diesel engine 5 and thus generate the air stream 9 having a constant temperature.

The through-hole 2 is formed to penetrate one side of the engine room 7, through which the tail pipe 1 extends outwardly from the engine room 7. Preferably, the through-hole 2 has a diameter larger than that of the tail pipe 1 to enclose the tail pipe, thereby smoothly supplying the air stream 9 generated by the cooling fan 3 into the space between the diffuser 4 and the tail pipe 1.

Figure 4:
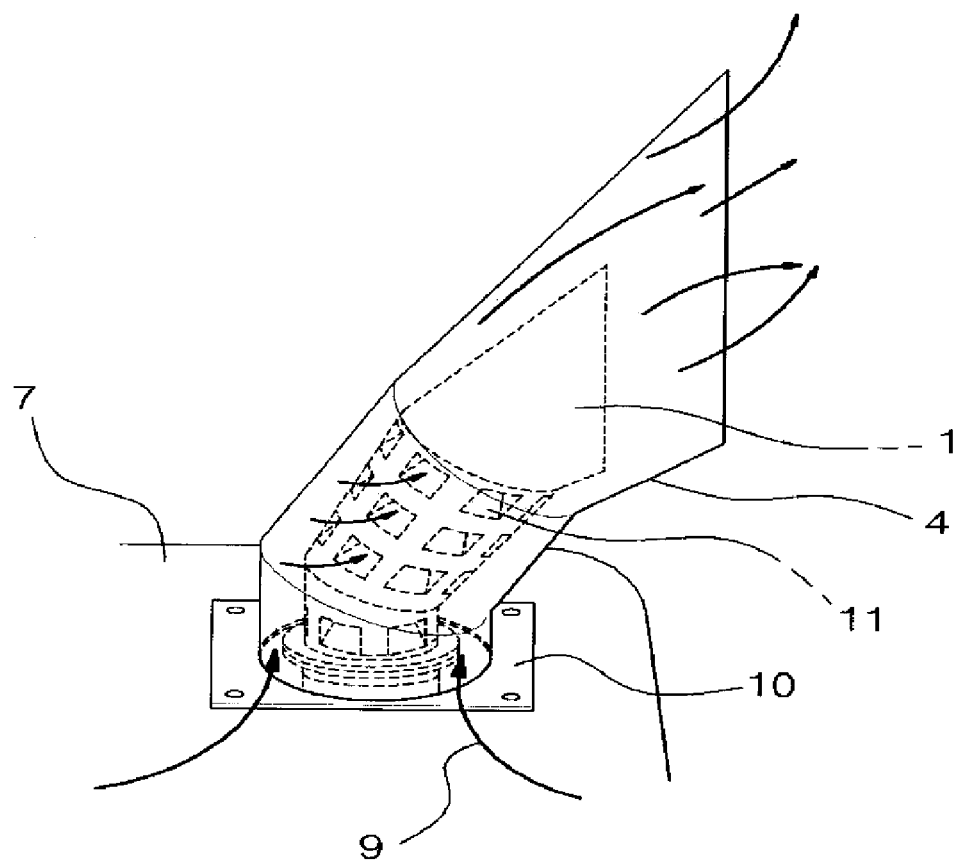
FIG. 4 is a perspective view illustrating a diffuser provided in the diesel particulate filter of the engine room shown in FIG. 2.

FIG. 4 is a perspective view illustrating the diffuser provided in the diesel particulate filter of the engine room shown in FIG. 2.

Referring to FIG. 4, the diffuser is a passage of a fluid, of which a cross-section area is gradually increased to reduce the velocity of the fluid. The diffuser lengthens a time required to mix the overheated gas with the air stream 9 generated by the cooling fan 3, thereby lowering the temperature of the gas finally discharged.

In particular, the diffuser 4 is a device for lowering the temperature of the overheated gas discharged from the tail pipe 1, and is engaged to the through-hole 2 to enclose the tail pipe 1 with a diameter larger than that of the tail pipe 1 and with a length longer than that of the tail pipe, so that a space is formed between the tail pipe and the diffuser. Thus, the diffuser 4 sucks the air stream 9 generated by the cooling fan 3 through the space to lower the temperature of the overheated gas discharged from the tail pipe 1.

More specifically, the diffuser 4 reduces the velocity of the air stream 9 to lengthen the time required to mix the air stream 9 with the overheated gas in the diffuser 4 or prevent dispersion of the air stream 9, so that it guides the air stream 9 into the tail pipe, thereby lowering the temperature of the overheated gas finally discharged.

Further, the diffuser 4 encloses the outer circumference of the tail pipe 1 to prevent a person from directly contacting the tail pipe heated by the overheated gas and thus person from suffering burn.

Preferably, the diffuser 4 includes a sealing portion 10 at a position in which the diffuser 4 is engaged to the through-hole 2, so that a gap between the diffuser and the through-hole 2 is completely sealed to prevent leakage of the air stream 9 generated by the cooling fan 3 and thus effectively lowering the temperature of the overheated gas.

In addition, it is preferable that the diffuser 4 is made of a material having heat resistance, heat isolation and pressure resistance, similar to the tail pipe 1.

The operation of the apparatus for cooling the overheated gas of the engine room according to an embodiment of the present disclosure will now be described.

In the case in which the particulate matter contained in the exhaust gas discharged from the diesel engine 5 is accumulated on the filter, the diesel particulate filter 6 burns the particulate matter by using an electric heater or burner so as to regenerate the filter. In this instance, the overheated gas generated at the above process is discharged from the engine room 7 through the tail pipe 1.

The cooling fan 3 provided at one side of the engine room 7 sucks the ambient air to generate the air stream 9 in the engine room 7.

The air stream 9 generated by the cooling fan 3 is discharged outwardly from the engine room 7 through the through-hole 2, in particular the space between the tail pipe 1 and the diffuser 4.

In this instance, the air stream 9 flowing between the tail pipe 1 and the diffuser 4 is not dispersed by the diffuser, and is mixed with the overheated gas in the diffuser 4 or flows in the tail pipe 1 through the guides 11 embossed on the outer circumference of the tail pipe 1, thereby lowering the temperature of the overheated gas finally discharged.

The guides 11 formed on the outer circumference of the tail pipe 1 prevent the overheated gas from flowing back in the engine room 7 so as to discharge the overheated gas outwardly.

Therefore, the apparatus for cooling the overheated gas of the engine room according to an embodiment of the present disclosure lowers the temperature of the overheated gas discharged from the tail pipe 1, thereby decreasing the possibility of injury of a human body, such as burn, or fire, and preventing the human from directly contacting the tail pipe heated by the overheated gas to decrease the possibility of the burn, by employing the diffuser 4.

In addition, it is possible to prevent the overheated gas from flowing back in the engine room 7 by using the guides 11 formed on the tail pipe 1, thereby preventing damage of various components and electric wiring in the engine room 7.

Although exemplary embodiments of the present disclosure have been described for illustrative purposes, those skilled in the art will appreciate that various modifications, additions and substitutions are possible, without departing from the scope and spirit of the present disclosure as disclosed in the accompanying claims.

The invention claimed is:

1. An apparatus for cooling overheated gas generated from a diesel particulate filter which is connected between a diesel engine and an exhaust pipe of the diesel engine, the apparatus comprising:
  a tail pipe for discharging outwardly the overheated gas discharged from the diesel particulate filter;
  a cooling fan, provided at one side of an engine room, for generating an air stream by sucking ambient air; and
  a diffuser enclosing an outer circumference of the tail pipe in such a way a space is formed between the diffuser and the tail pipe to prevent the diffuser from directly contacting the tail pipe;
  wherein the engine room is provided with a through-hole penetrating one side of the engine room; and
  wherein the tail pipe has one end connected to the diesel particulate filter, and the other end extended outwardly from the engine room through the through-hole;
  wherein the tail pipe comprises guide means for smoothly guiding the air stream generated by the cooling fan into the tail pipe and for preventing the overheated gas from flowing back into the engine room, and
  wherein the diffuser comprises means for mixing the air stream generated by the cooling fan with the overheated gas discharged from the tail pipe or for guiding the air stream into the tail pipe such that the diffuser is adapted to lower a temperature of the overheated gas.

2. The apparatus as claimed in claim 1, wherein the diffuser includes a sealing portion at a position in which the diffuser is engaged to the through-hole to completely seal a gap between the diffuser and the through-hole.

3. The apparatus as claimed in claim 1, wherein the guide means comprises a plurality of guides inwardly embossed on a circumference of a portion of the tail pipe that extends outwardly from the engine room through the through-hole.

4. The apparatus as claimed in claim 3, wherein the diffuser completely encloses the portion of the tail pipe that extends outwardly from the engine room through the through-hole.

5. The apparatus as claimed in claim 4, wherein the diffuser has a cross-section that gradually widens so as to reduce velocity of fluid flowing through the diffuser.

6. An apparatus comprising:
  (a) an engine room comprising a through-hole penetrating one side of the engine room;
  (b) a diesel engine disposed in the engine room;
  (c) an exhaust pipe for the diesel engine disposed in the engine room;
  (d) a diesel particulate filter disposed in the engine room and between the diesel engine and the exhaust pipe for collecting and burning particulate matter discharged from the diesel engine;
  (e) a tail pipe for discharging outwardly overheated gas discharged from the diesel particulate filter, the tail pipe having a first end connected to the diesel particulate filter and a second end extending outwardly from the engine room through the through-hole;
  (f) a cooling fan disposed in the engine room for generating an air stream by sucking ambient air; and
  (g) diffuser means for mixing the air stream generated by the cooling fan with the overheated gas discharged from the tail pipe or for guiding the air stream into the tail pipe so as to lower a temperature of the overheated gas;
  wherein the tail pipe comprises guide means for smoothly guiding the air stream generated by the cooling fan into the tail pipe and for preventing the overheated gas from flowing back into the engine room.

7. The apparatus as claimed in claim 6, wherein the diffuser means comprises a diffuser enclosing an outer circumference of the tail pipe, the diffuser being spaced from the outer circumference such that the diffuser does not directly contact the tail pipe.

8. The apparatus as claimed in claim 7, wherein the guide means comprises a plurality of guides inwardly embossed on a circumference of a portion of the tail pipe that extends outwardly from the engine room through the through-hole.

9. The apparatus as claimed in claim 8, wherein the diffuser completely encloses the portion of the tail pipe that extends outwardly from the engine room through the through-hole.

10. The apparatus as claimed in claim 9, wherein the diffuser has a cross-section that gradually widens so as to reduce velocity of fluid flowing through the diffuser.

11. The apparatus as claimed in claim 10, wherein the diffuser includes a sealing portion that completely seals a gap between the diffuser and the through-hole.

* * * * *